(12) United States Patent
France

(10) Patent No.: US 10,943,439 B2
(45) Date of Patent: Mar. 9, 2021

(54) POKER GAMING SYSTEMS AND METHODS WITH SIDE BETTING USING POST-FOLDING CARD DRAWS

(71) Applicant: Matthew France, Merseyside (GB)

(72) Inventor: Matthew France, Merseyside (GB)

(*) Notice: Subject to any disclaimer, the term of this patent is extended or adjusted under 35 U.S.C. 154(b) by 101 days.

(21) Appl. No.: 16/290,037

(22) Filed: Mar. 1, 2019

(65) Prior Publication Data
US 2020/0279458 A1    Sep. 3, 2020

(51) Int. Cl.
G07F 17/32    (2006.01)

(52) U.S. Cl.
CPC ...... G07F 17/3293 (2013.01); G07F 17/3223 (2013.01); G07F 17/3276 (2013.01)

(58) Field of Classification Search
CPC ............. G07F 17/3293; G07F 17/3276; G07F 17/3244; G07F 17/3288; G07F 17/3272; G07F 17/3223
See application file for complete search history.

(56) References Cited

U.S. PATENT DOCUMENTS

| | | | |
|---|---|---|---|
| 6,102,402 A | 8/2000 | Scott et al. | |
| 6,227,969 B1* | 5/2001 | Yoseloff | A63F 1/18 273/143 R |
| 7,661,678 B2 | 2/2010 | Snow | |
| 8,695,984 B2 | 4/2014 | Nicely et al. | |
| 8,998,693 B1 | 4/2015 | Friedman | |
| 9,373,220 B2 | 6/2016 | Yoseloff | |
| 9,564,016 B2 | 2/2017 | LaDuca | |
| 9,715,791 B2 | 7/2017 | LaDuca | |
| 2008/0111308 A1 | 5/2008 | Snow | |
| 2008/0224401 A1 | 9/2008 | Okada | |
| 2011/0207522 A1* | 8/2011 | Girafi | G07F 17/32 463/22 |
| 2013/0130763 A1 | 5/2013 | Silverman | |
| 2014/0024434 A1 | 1/2014 | Rudd et al. | |
| 2014/0077457 A1 | 3/2014 | Snow | |
| 2014/0087804 A1 | 3/2014 | Snow | |
| 2014/0179391 A1 | 6/2014 | LaDuca | |
| 2014/0265127 A1 | 9/2014 | Moody | |
| 2015/0221185 A1 | 8/2015 | Dunaevsky et al. | |

(Continued)

FOREIGN PATENT DOCUMENTS

WO    2013033523 A2    3/2013

OTHER PUBLICATIONS

PokerStars.pdf, Youtube.com and Brad Willis, 2015 and 2017, Youtube.com and PokerStars.com, pp. 1-4, at https://www.youtube.com/watch?v=vv2nnEDwZXek and https://www.pokerstars.com/en/blog/2017/weekend-review-micromillions-set-to-crow-167344.shtml, (last visited Aug. 4, 2020). (Year: 2017).*

(Continued)

*Primary Examiner* — Steve Rowland
(74) *Attorney, Agent, or Firm* — Law Office of Andrei D Popovici, PC

(57) ABSTRACT

Online multi-player poker systems and methods allow a player to continue drawing cards for a side bet award even after folding in the part of the game played against other players. A player may lose an interplayer game against other players by folding, and still win a side bet award determined by the final hand of the player during the round of play. The described systems and methods facilitate maintaining user engagement in multi-player games.

15 Claims, 12 Drawing Sheets

(56) References Cited

U.S. PATENT DOCUMENTS

| | | |
|---|---|---|
| 2015/0254938 A1 | 9/2015 | Iddings |
| 2016/0019754 A1 | 1/2016 | Elias et al. |
| 2016/0049045 A1* | 2/2016 | Snow ................. G07F 17/3244 463/25 |
| 2016/0136511 A9 | 5/2016 | Snow et al. |
| 2016/0148467 A1* | 5/2016 | Snow ................. G07F 17/3293 463/25 |
| 2016/0247355 A1 | 8/2016 | Naylor et al. |
| 2017/0193755 A1 | 7/2017 | Hemberger et al. |
| 2017/0312618 A1 | 11/2017 | Milosevich et al. |
| 2018/0221756 A1 | 8/2018 | Snow |

OTHER PUBLICATIONS

European Patent Office, International Search Report and Written Opinion dated Jun. 18, 2020 for PCT International Application No. PCT/IB2020/051485, international filing date Feb. 21, 2020, priority date Mar. 1, 2019.

* cited by examiner

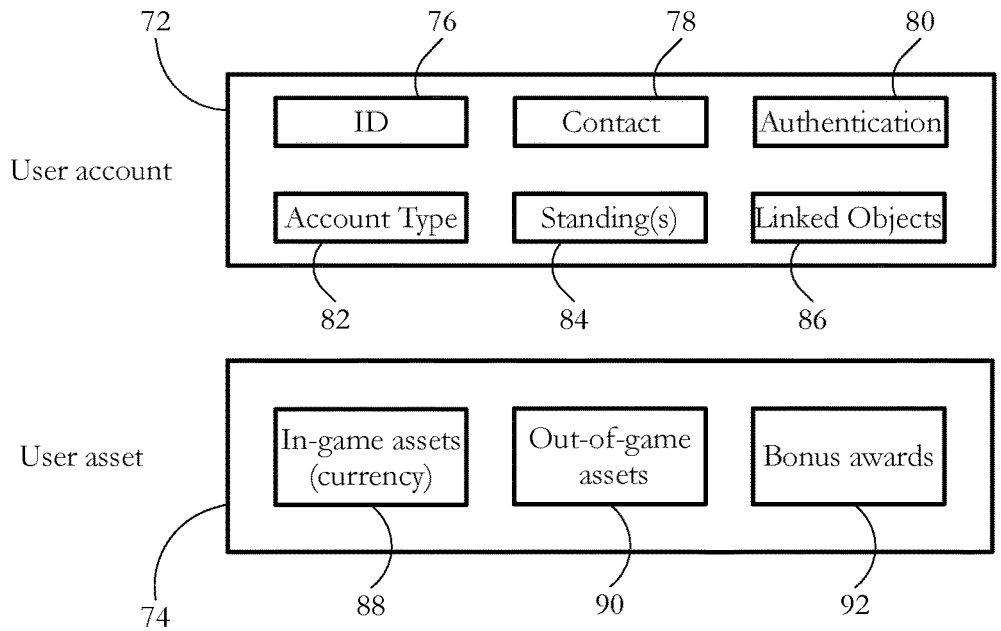
FIG. 4-A
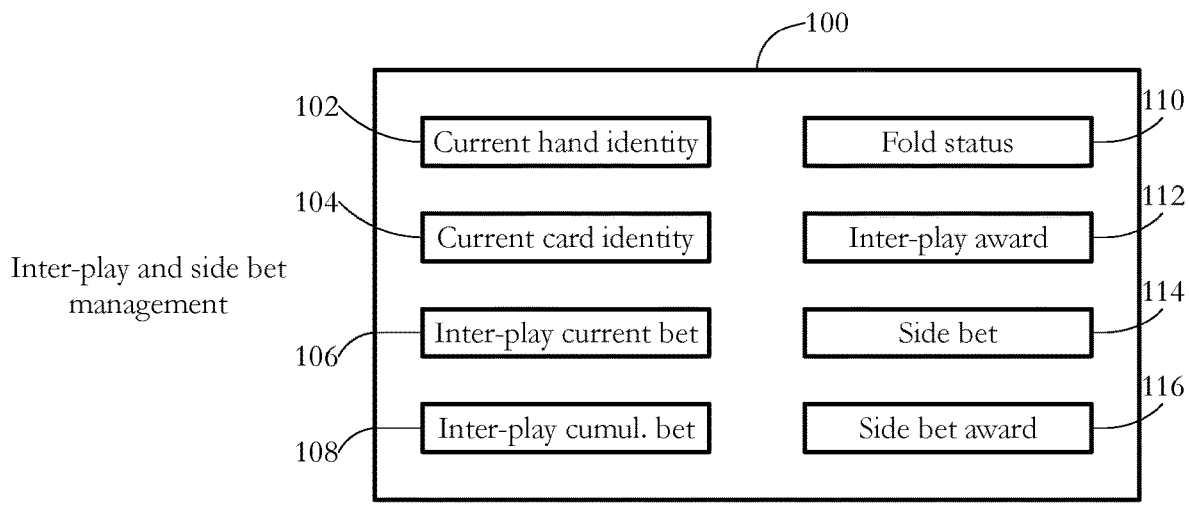
FIG. 4-B

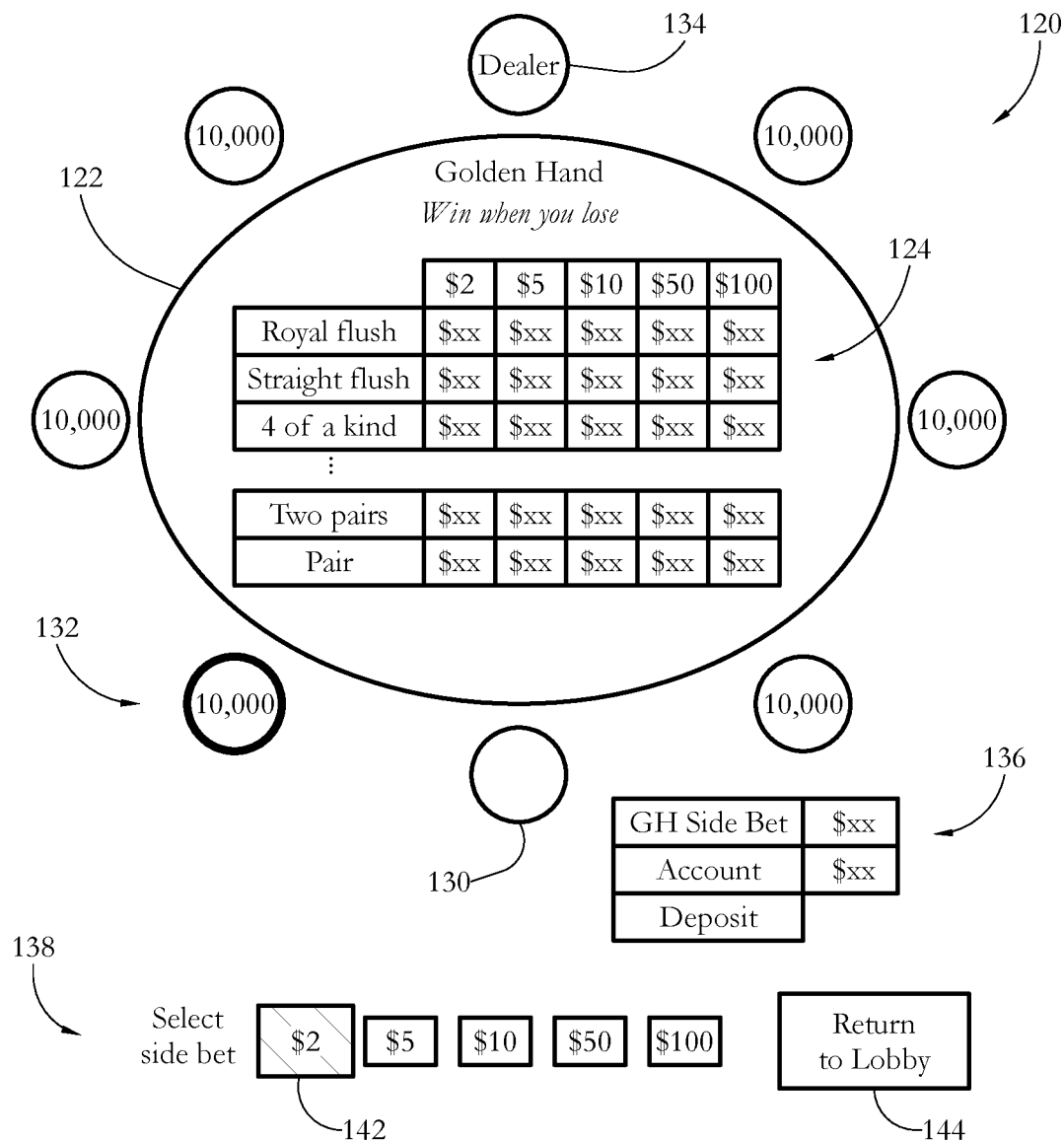
FIG. 5-A

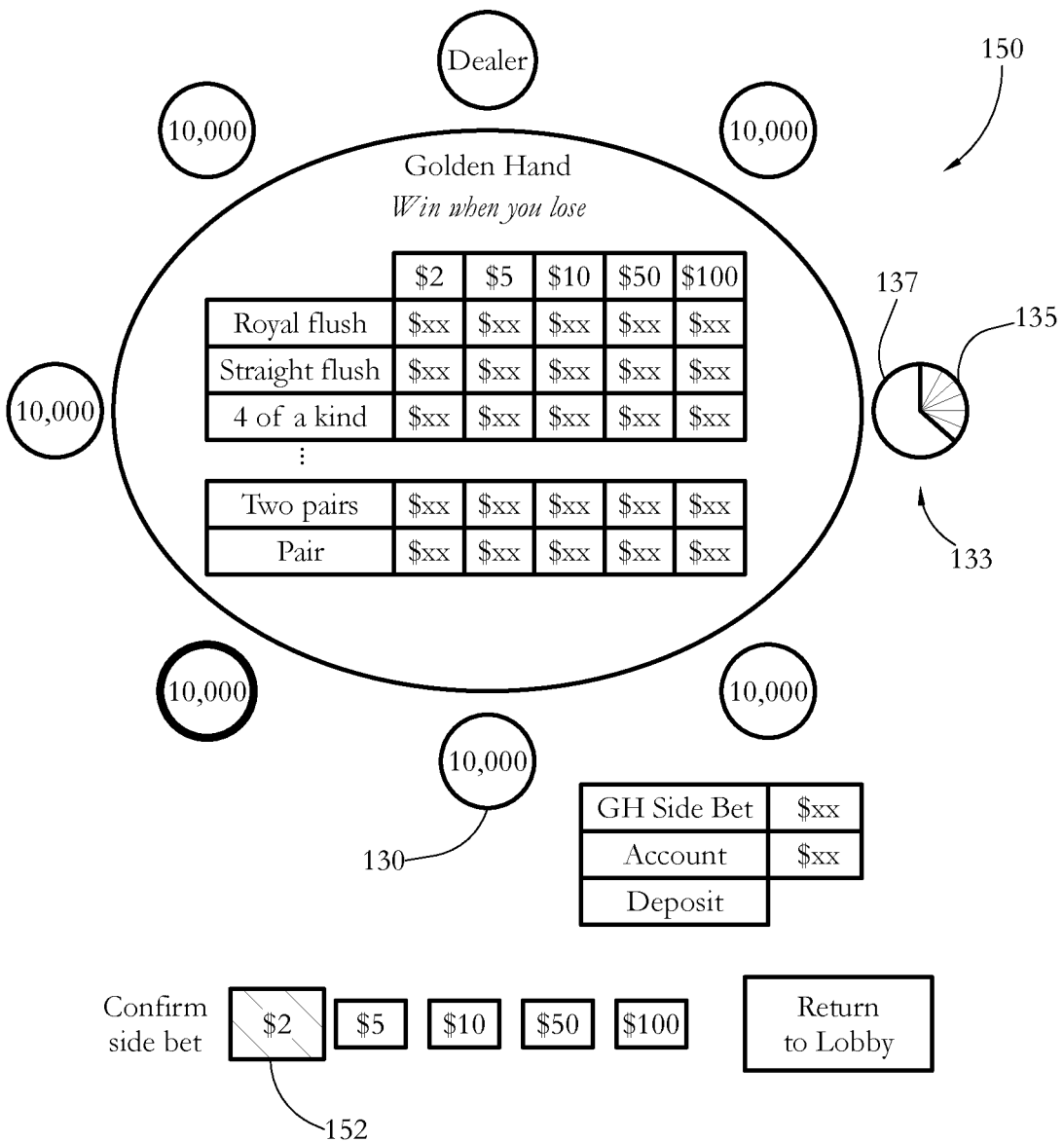
FIG. 5-B

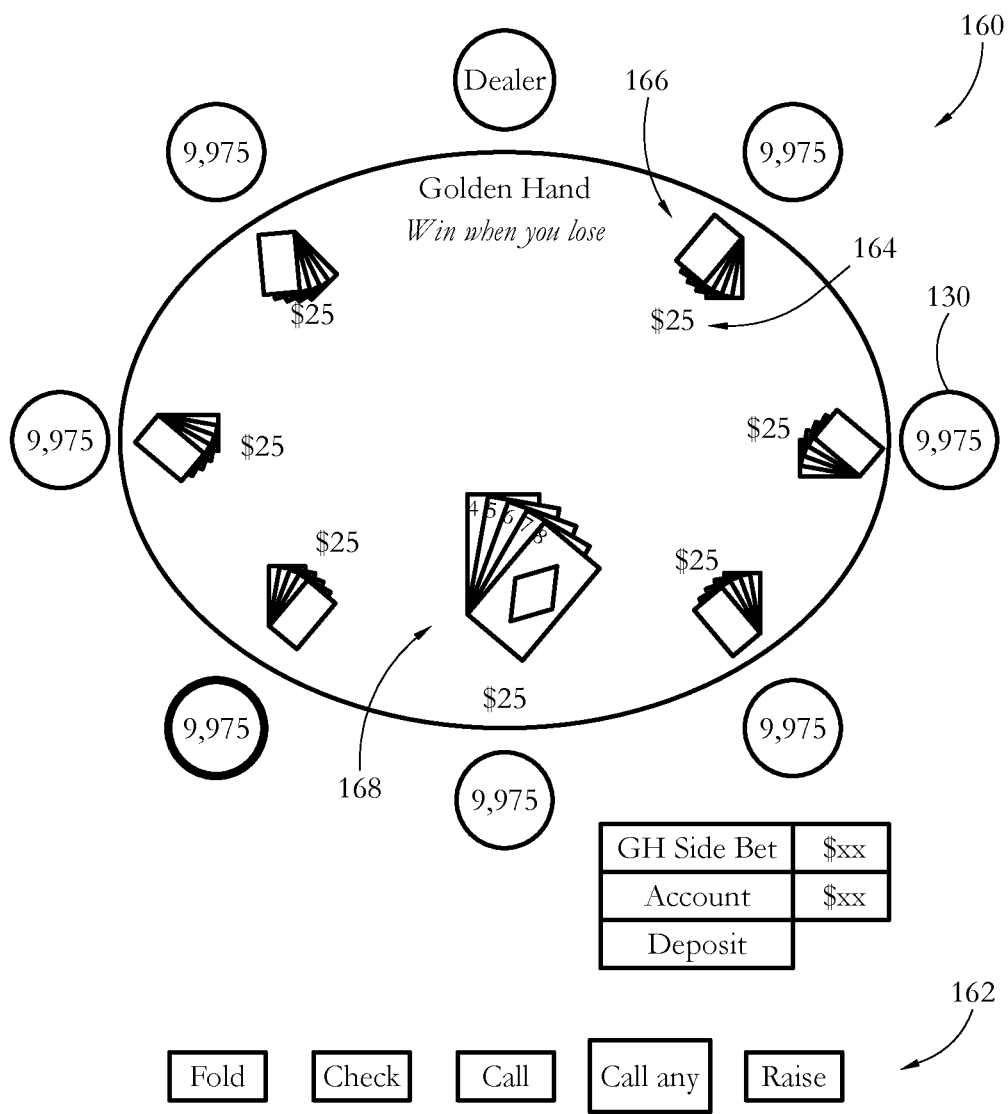
FIG. 5-C

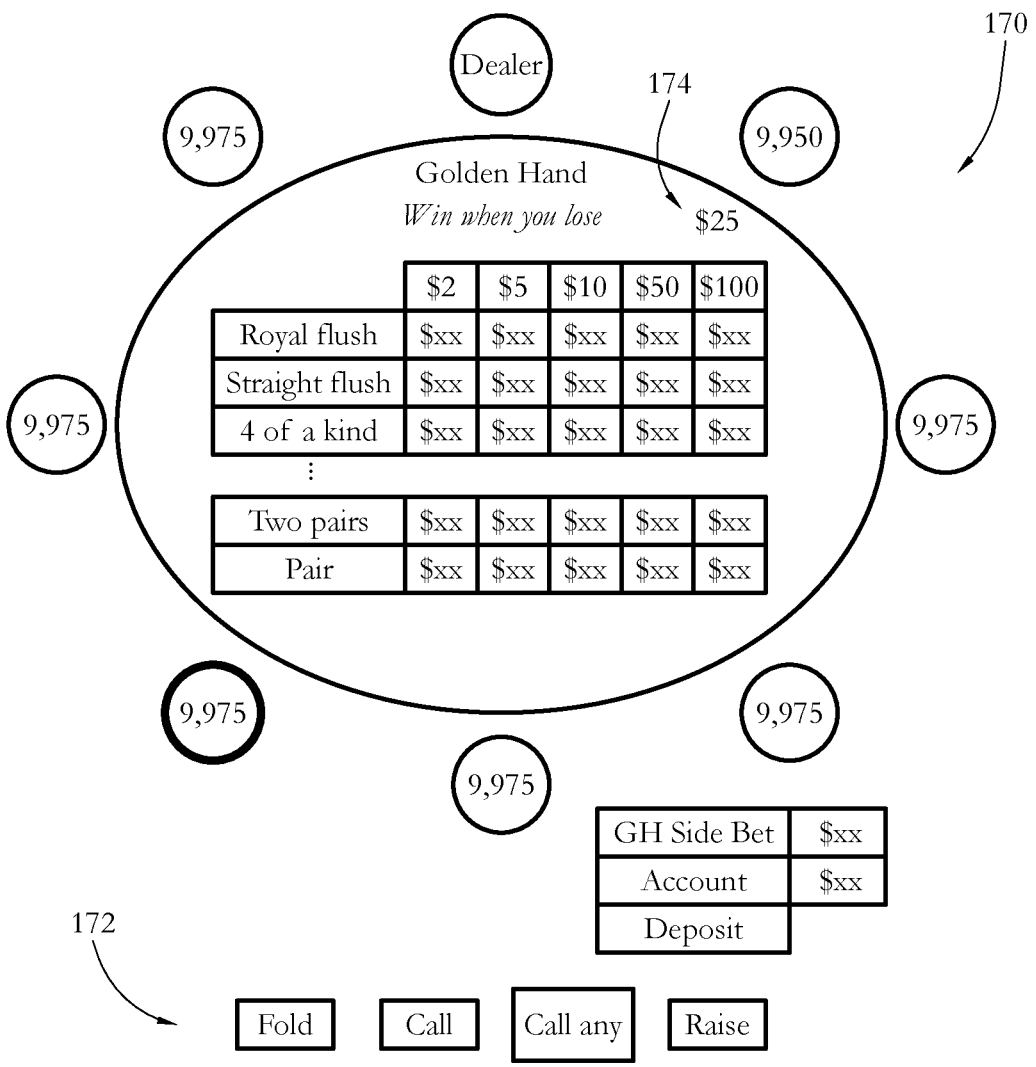
FIG. 5-D

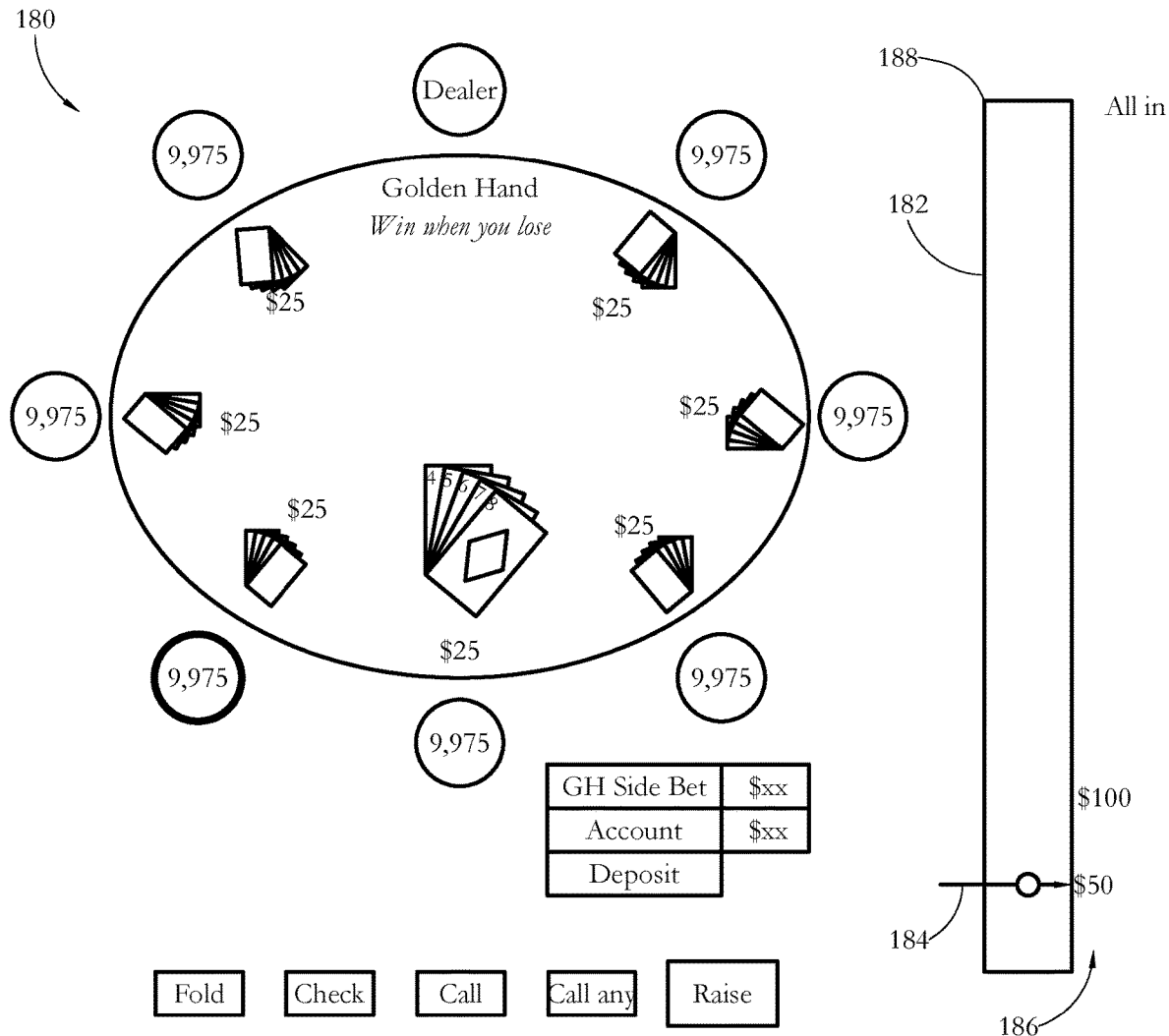
FIG. 5-E

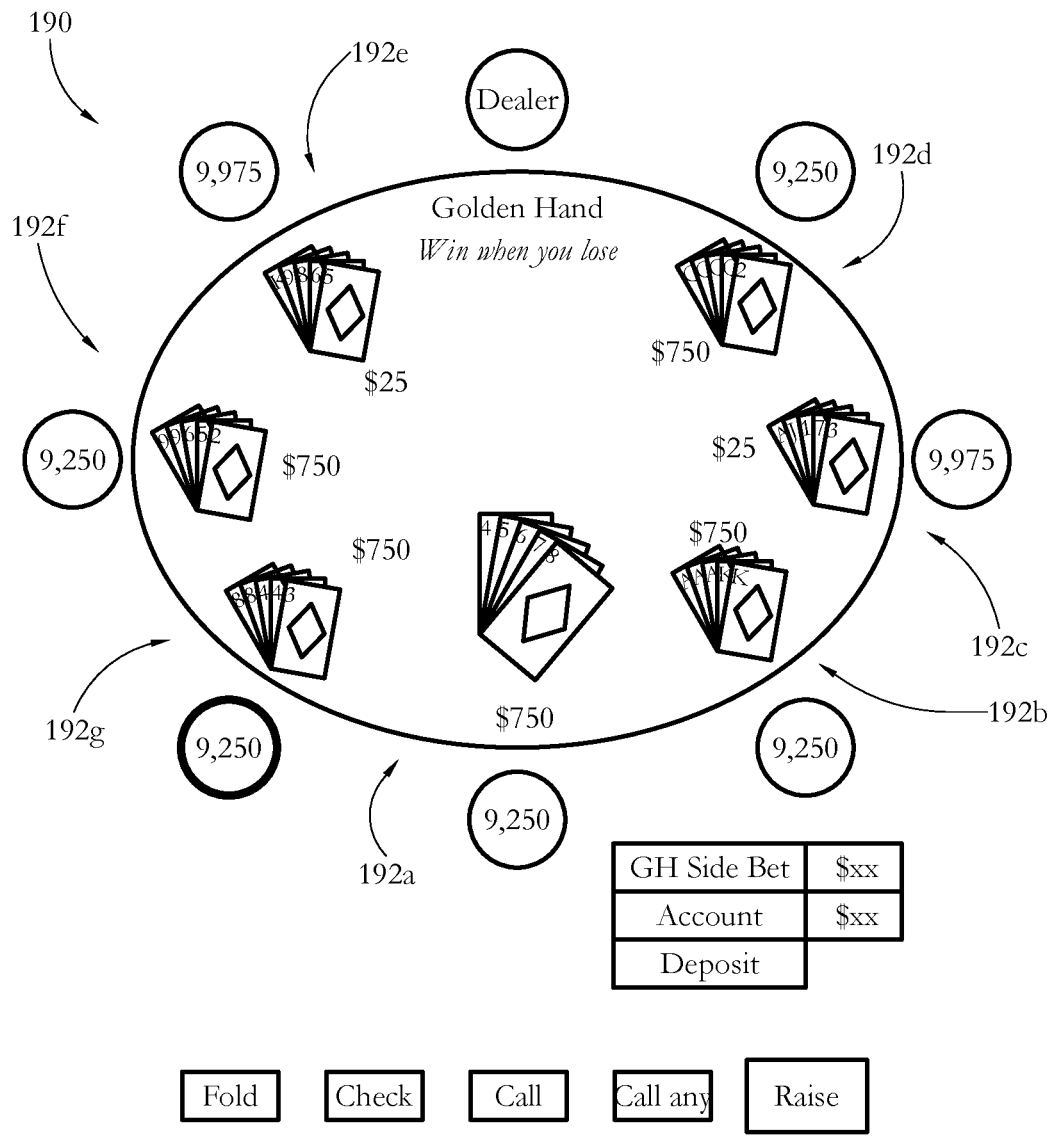
FIG. 5-F

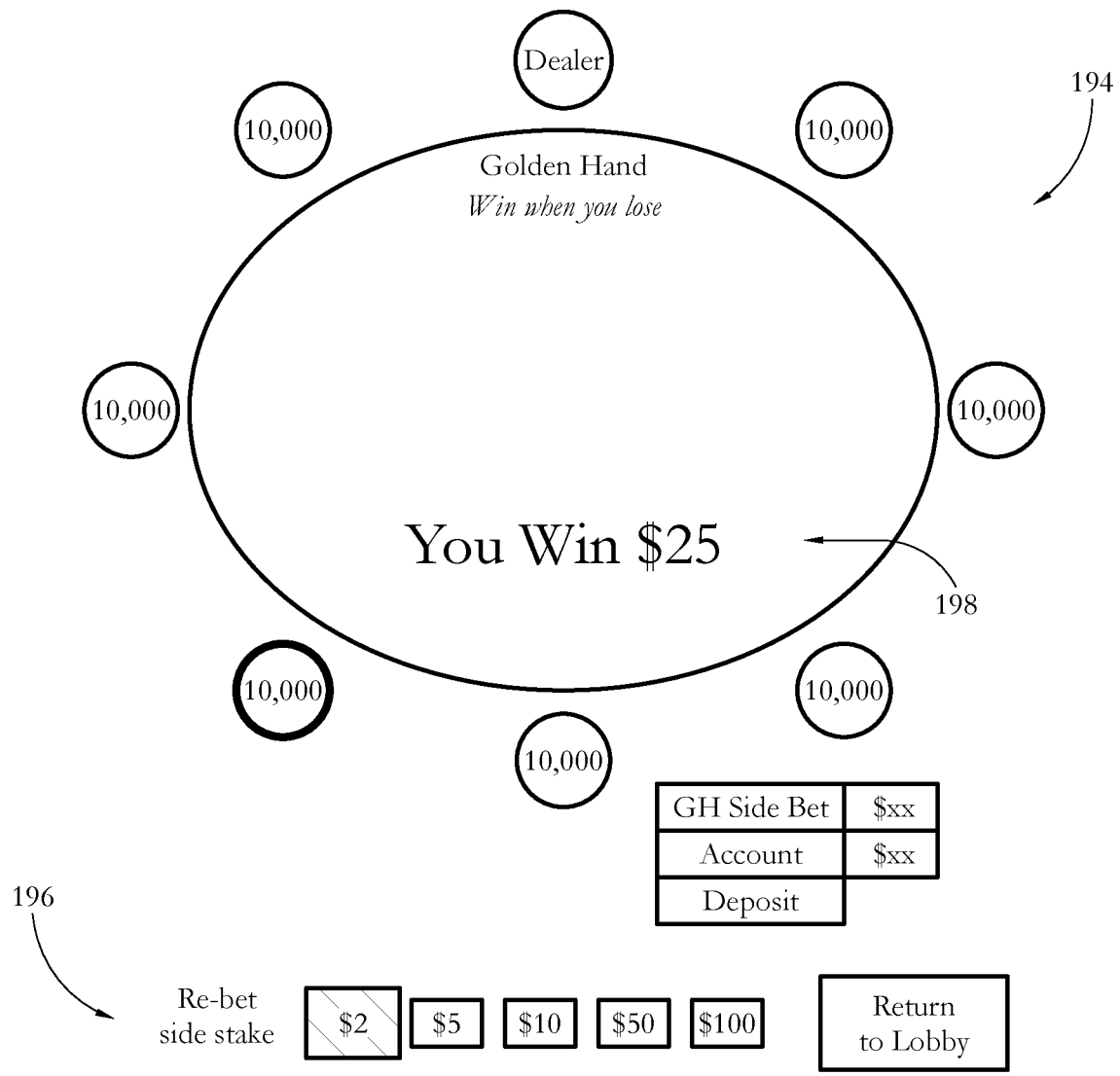
FIG. 5-G

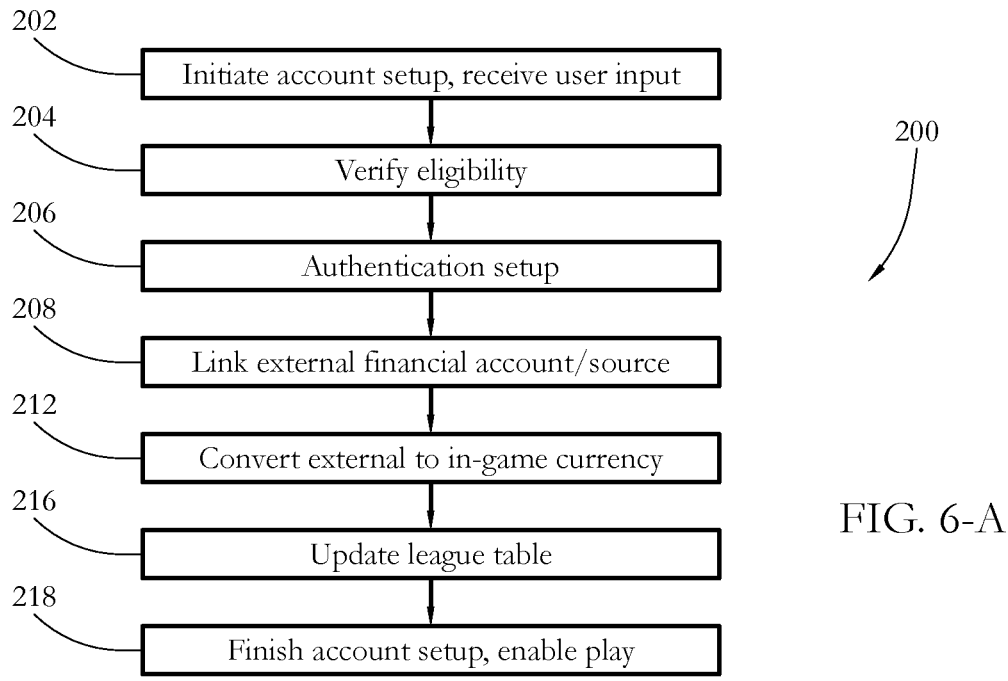
FIG. 6-A
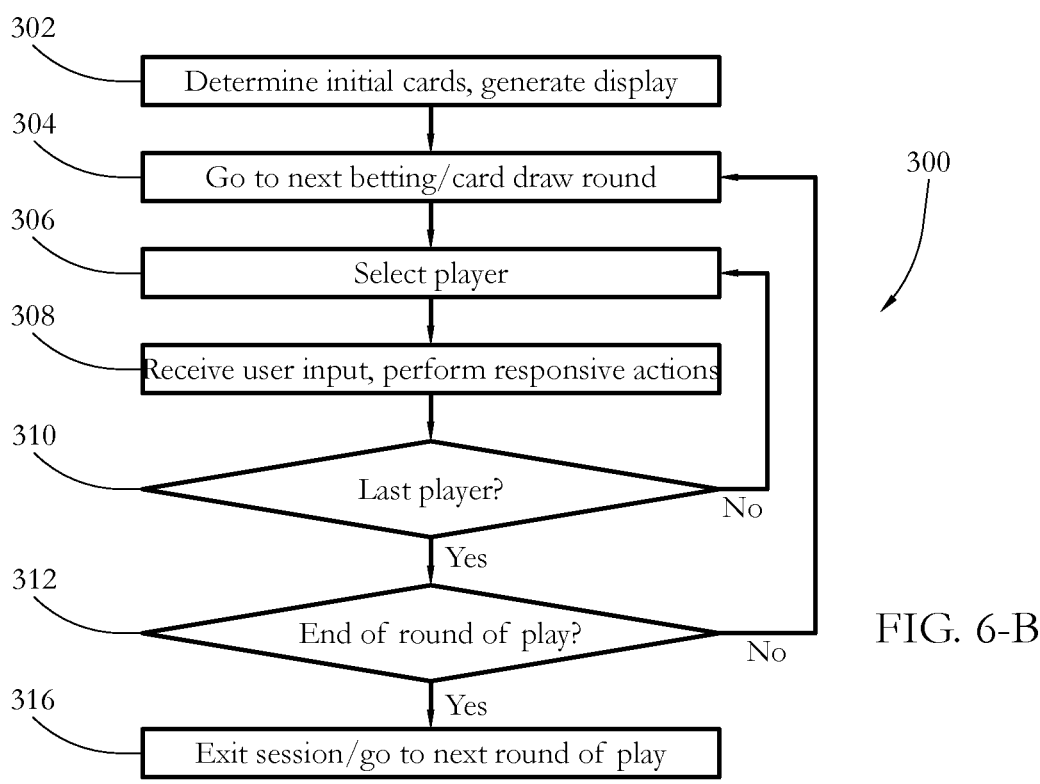
FIG. 6-B

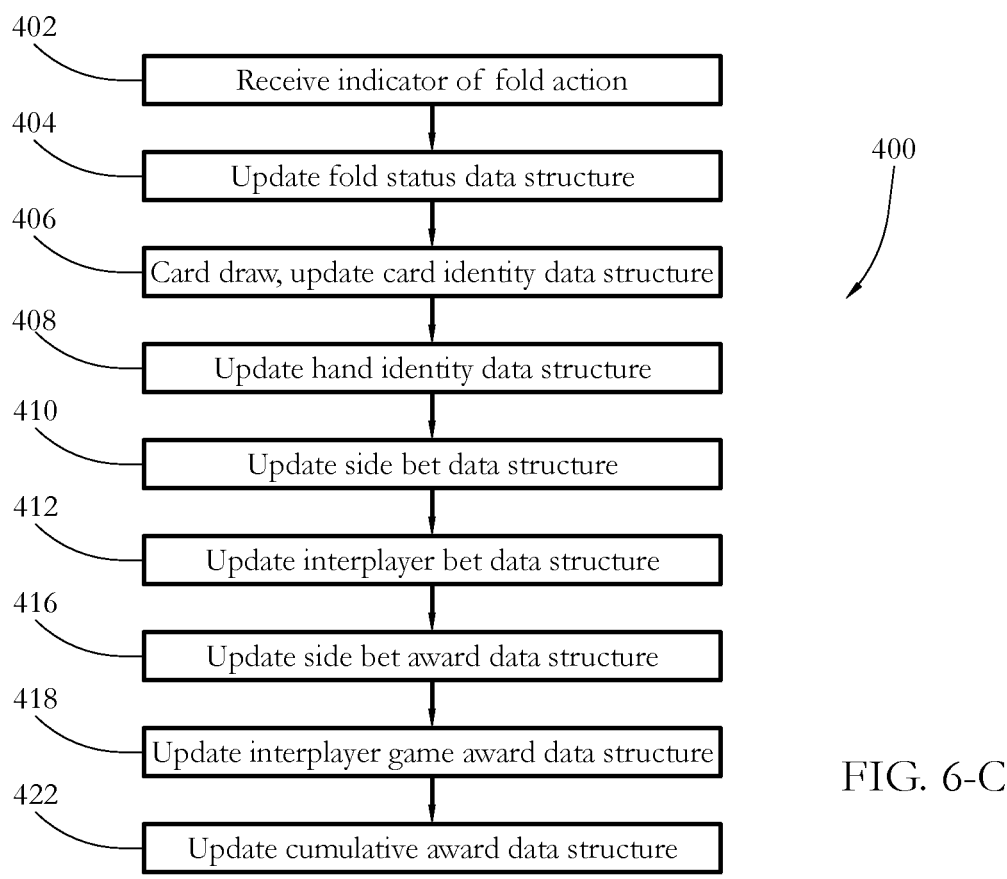
FIG. 6-C

POKER GAMING SYSTEMS AND METHODS WITH SIDE BETTING USING POST-FOLDING CARD DRAWS

BACKGROUND

The invention relates to poker gaming systems and methods, and in particular to systems and methods for playing poker games with dynamic side betting.

Today's consumer faces an increasing array of entertainment options, including movies, TV, social media, other online content, and gaming. Maintaining user engagement is a key challenge for entertainment providers. An additional goal of video game architects is to facilitate efficient development and maintenance of video games, in a manner that minimizes the burden on developers.

SUMMARY

According to one aspect, a computer system comprises at least one hardware processor and associated memory storing instructions which, when executed, cause the at least one hardware processor to: connect to a plurality of player computer systems over a network, each player computer system configured to receive user input from a corresponding poker player of a plurality of poker players; generate a multi-player poker game display comprising a representation of a playing surface, and representations of playing cards in a poker game played by the plurality of players against each other, wherein a round of play of the poker game includes a card draw round; receive from a player computer system an indicator of user input selecting a fold action for a user's hand in the round of play; in response to receiving the indicator of the user input selecting the fold action, update an interplayer game fold status data structure maintaining a fold status for the user's hand for the round of play; receive from the player computer system an indicator of user input selecting a card draw action for the user's hand in the round of play, wherein the card draw action is subsequent to the fold action in the round of play; update a hand identity data structure for the user according to the card draw action, the hand identity data structure comprising a plurality of card identification fields identifying a current playing hand of the user; and update a side bet award data structure for the user according to a playing hand of the user identified by the hand identity data structure at an end of the round of play.

According to another aspect, a non-transitory computer-readable medium encodes instructions which, when executed by a computer system comprising at least one hardware processor and an associated memory, cause the computer system to: connect to a plurality of player computer systems over a network, each player computer system configured to receive user input from a corresponding poker player of a plurality of poker players; generate a multi-player poker game display comprising a representation of a playing surface, and representations of playing cards in a poker game played by the plurality of players against each other, wherein a round of play of the poker game includes a card draw round; receive from a player computer system an indicator of user input selecting a fold action for a user's hand in the round of play; in response to receiving the indicator of the user input selecting the fold action, update an interplayer game fold status data structure maintaining a fold status for the user's hand for the round of play; receive from the player computer system an indicator of user input selecting a card draw action for the user's hand in the round of play, wherein the card draw action is subsequent to the fold action in the round of play; update a hand identity data structure for the user according to the card draw action, the hand identity data structure comprising a plurality of card identification fields identifying a current playing hand of the user; and update a side bet award data structure for the user according to a playing hand of the user identified by the hand identity data structure at an end of the round of play.

According to another aspect, a method comprises employing at least one hardware processor and associated memory to: connect to a plurality of player computer systems over a network, each player computer system configured to receive user input from a corresponding poker player of a plurality of poker players; generate a multi-player poker game display comprising a representation of a playing surface, and representations of playing cards in a poker game played by the plurality of players against each other, wherein a round of play of the poker game includes a card draw round; receive from a player computer system an indicator of user input selecting a fold action for a user's hand in the round of play; in response to receiving the indicator of the user input selecting the fold action, update an interplayer game fold status data structure maintaining a fold status for the user's hand for the round of play; receive from the player computer system an indicator of user input selecting a card draw action for the user's hand in the round of play, wherein the card draw action is subsequent to the fold action in the round of play; update a hand identity data structure for the user according to the card draw action, the hand identity data structure comprising a plurality of card identification fields identifying a current playing hand of the user; and update a side bet award data structure for the user according to a playing hand of the user identified by the hand identity data structure at an end of the round of play.

BRIEF DESCRIPTION OF THE DRAWINGS

The foregoing aspects and advantages of the present invention will become better understood upon reading the following detailed description and upon reference to the drawings where:

FIGS. 4-A-B show a number of exemplary data structures maintained by one or more computer systems according to some embodiments of the present invention.

FIGS. 5-A-G show exemplary local client displays illustrating a game-play sequence according to some embodiments of the present invention.

FIG. 6-A shows an exemplary flow chart illustrating an account setup sequence according to some embodiments of the present invention.

FIG. 6-B shows an exemplary flow chart illustrating a game play sequence for a round of play according to some embodiments of the present invention.

FIG. 6-C shows another exemplary flow chart illustrating a game play sequence for at least part of a round of play according to some embodiments of the present invention.

DETAILED DESCRIPTION

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. A data structure may include one or more variables of the same or different variable types (e.g. array, int, bool, char, double, float, etc.). Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
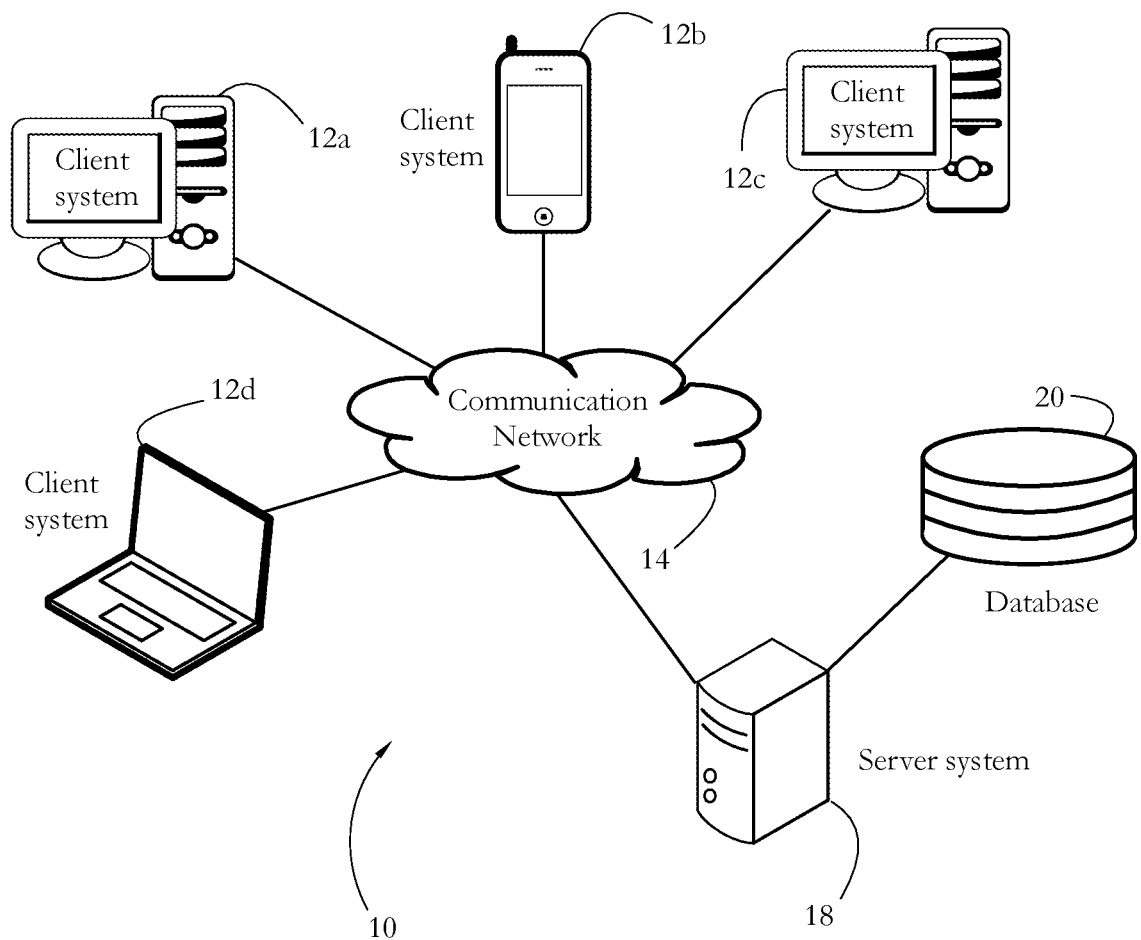
FIG. 1 shows an exemplary computer system and associated network environment according to some embodiments of the present invention.

FIG. 1 shows an exemplary multi-player network poker gaming system 10 according to some embodiments of the present invention. A plurality of client systems 12*a-d* may interact with a server system 18 over a communications network 14. Communications network 14 may include at least parts of a wide area network (a network including at least one router/OSI layer 4 device), and/or a local area network (a network including switches/OSI layer 2 devices). Server system 18 may connect to client systems 12*a-d* using one or more network protocols including TCP/IP, HTTP/HTTPS (Hypertext Transfer Protocol/Secure), and/or other protocols suitable for interchanging data between web services such as RESTful (Representational State Transfer) web services. Server system 18 may include one or more interconnected servers, and is connected to a database 20. Server system 18 may include servers hosted at different locations, and possibly owned by different entities. For example, server system 18 may include servers operated by a gaming service provider, as well as servers operated by third party service providers (e.g. Amazon Web Services, or AWS). In some embodiments, different servers may be used to implement different parts of the functionality described below; for example, authentication and account management functions may be provided by one set of servers, while more computationally-intensive game-playing functions may be provided by another, distinct set of servers of server system 18.

Exemplary client systems 12*a-d* include personal computer systems, mobile computing platforms (laptop computers, tablets, mobile telephones), entertainment devices (TVs, game consoles), augmented reality (AR) devices, virtual reality (VR) devices such as headsets and associated input devices, and/or other electronic devices comprising a processor, a memory, and a communication interface.

Figure 2:
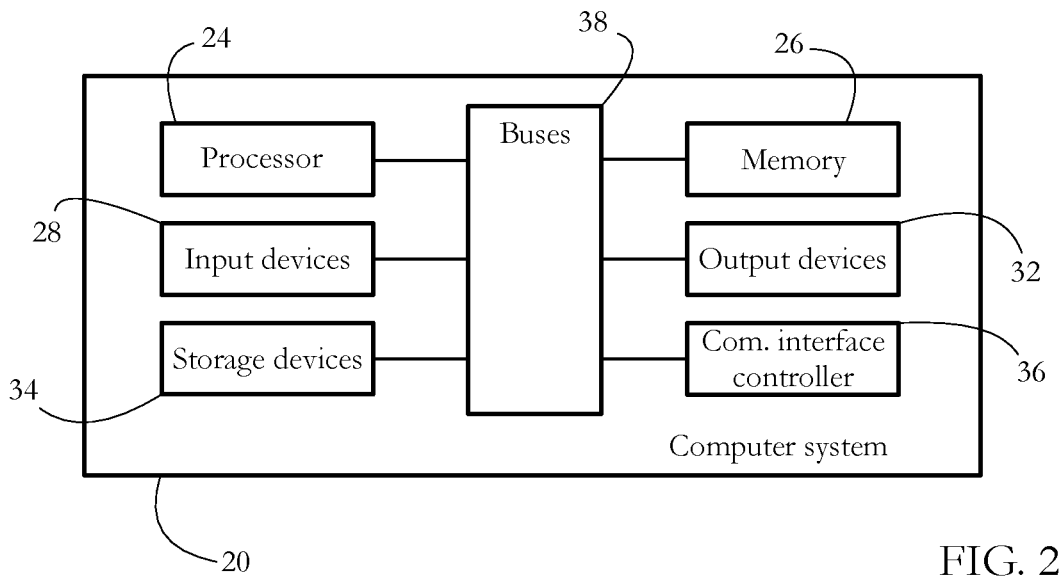
FIG. 2 shows an exemplary hardware configuration of a computer system according to some embodiments of the present invention.

FIG. 2 shows an exemplary hardware configuration of an exemplary computer system 20, which may represent a client system 12*a-d* and/or at least part of server system 18. Without loss of generality, the illustrated client system is a computer system. The hardware configuration of other client systems (e.g., mobile telephones, smartwatches) may differ somewhat from the one illustrated in FIG. 2. Computer system 20 comprises a set of physical devices, including a hardware processor 24 and a memory unit 26. Processor 24 comprises a physical device (e.g. a microprocessor, a multi-core integrated circuit formed on a semiconductor substrate, etc.) configured to execute computational and/or logical operations with a set of signals and/or data. In some embodiments, such operations are delivered to processor 24 in the form of a sequence of processor instructions (e.g. machine code or other type of encoding). Memory unit 26 may comprise volatile computer-readable media (e.g. DRAM, SRAM) storing instructions and/or data accessed or generated by processor 24.

Input devices 28 may include computer keyboards, mice, and microphones, among others, including the respective hardware interfaces and/or adapters allowing a user to introduce data and/or instructions into computer system 20. Output devices 32 may include display devices such as monitors and speakers among others, as well as hardware interfaces/adapters such as graphic cards, allowing computer system 20 to communicate data to a user. In some embodiments, input devices 28 and output devices 32 may share a common piece of hardware, as in the case of touch-screen devices. Storage devices 34 include computer-readable media enabling the non-volatile storage, reading, and writing of software instructions and/or data. Exemplary storage devices 34 include magnetic and optical disks and flash memory devices, as well as removable media such as CD and/or DVD disks and drives. A set of network adapters (communications interface controllers) 36 enables computer system 20 to connect to a computer network and/or to other devices/computer systems. A controller hub 38 represents the plurality of system, peripheral, and/or chipset buses, and/or all other circuitry enabling the communication between processor 24 and devices 26, 28, 32, 34, and 36. For instance, controller hub 38 may include a memory controller, an input/output (I/O) controller, and an interrupt controller, among others. In another example, controller hub 38 may comprise a northbridge connecting processor 24 to memory 26 and/or a southbridge connecting processor 24 to devices 28, 32, 34, and 36.

Figure 3:
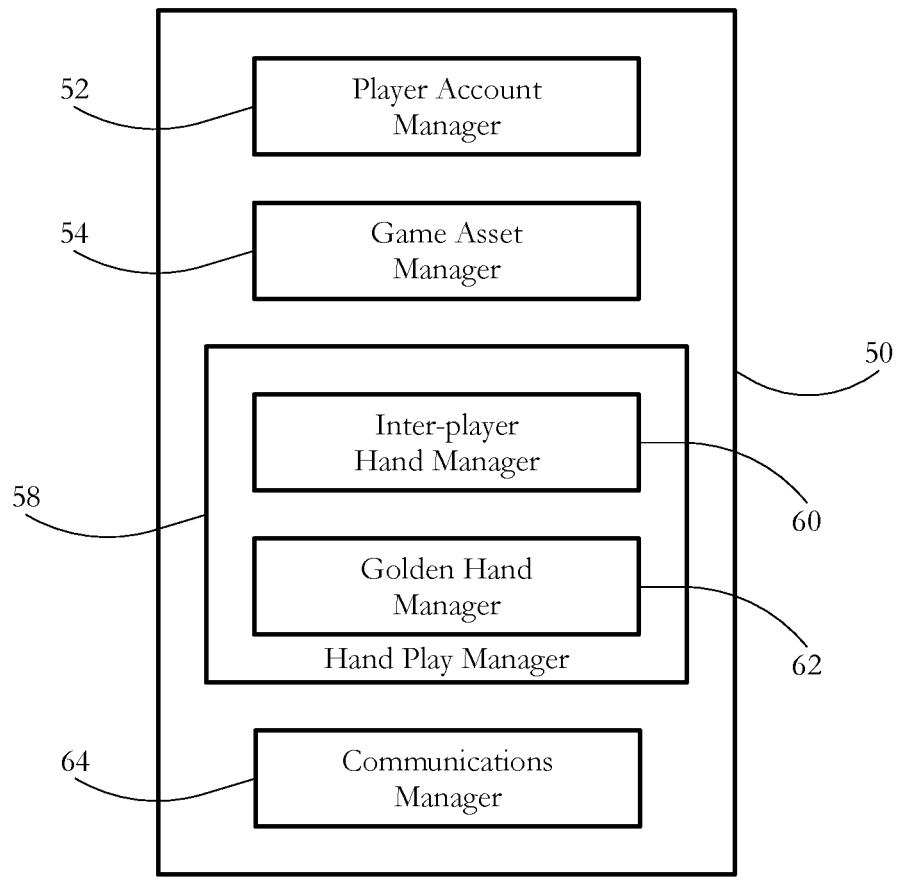
FIG. 3 shows exemplary components of a poker gaming system according to some embodiments of the present invention.

FIG. 3 shows exemplary components of a poker gaming system 50 according to some embodiments of the present invention. Gaming system 50 may be implemented on server computer system 18. In some embodiments, at least some of the components of gaming system 50 may be implemented on one or more client devices 12*a-d*. Gaming system 50 includes a player account manager 52, a game asset manager 54, a hand play manager 58, and a communications manager 64. Hand play manager 58 includes an interplayer hand manager 60 and a side bet ("Golden Hand") manager 62, as described below.

Player account manager 52 performs a number of player account management functions, including maintaining/updating player account information/attributes such as username, address, and/or connections to other player accounts and/or system objects. Game asset manager 54 manages the game assets (e.g. game currency amounts) of user accounts in response to external transactions (e.g. deposits from and withdrawals to bank accounts of other stores of currency/legal tender) and internal in-game transactions (e.g. bets, winnings and bonuses transacted in game currency. Game asset manager 54 also manages the conversion of external assets to/from game assets (e.g. game currency). External (out-of-game) assets may include government-issued currency (e.g. USD, GBP, Euro, or other legal tender), or digital currency such as Bitcoin, among others.

Hand play manager 58 performs a number of hand play management functions as described below. Hand play manager 58 communicates changes to game assets for each player to game asset manager 54. Such changes to game assets result from player input and/or the results of games, as described below. Interplayer hand manager 60 performs a number of management functions implementing game play among multiple players, while side bet (Golden Hand) manager 62 performs a number of side bet management functions, as described below.

Communications manager 64 performs a number of communication functions implementing the communications involved between server system 18 and the user interfaces of various client systems 12a-d. Communications manager 64 may also implement authentication, access control and security functions.

FIGS. 4-A-B show a number of exemplary data structures maintained by one or more computer systems according to some embodiments of the present invention. In particular, FIG. 4-A shows a set of exemplary user account and user asset management data structure(s) 72, 74 while FIG. 4-B shows a set of exemplary inter-play and side bet (Golden Hand) management data structure(s) 100. Each illustrated data structure may include one or more variables of homogeneous or heterogeneous type(s), and may in turn include other data structures.

As shown in FIG. 4-A, user account data structures 72 may include an account identifier (ID) data structure 76 storing one or more account identifiers (e.g. username) for each account, a contact data structure 78 storing contact data for each account (e.g. email address, phone number), an authentication data structure 80 storing authentication data for each account (e.g. salted/hashed password values), an account type data structure 82 storing an account type identifier for each account (e.g. free, premium, administrator), a league standing data structure 84 storing a standing within a player league for each account, and a linked-object data structure 86 storing identifiers of objects linked to each account. Linked-object data structure 86 may be a graph data structure comprising nodes and associated inter-node links, and may store identifiers of other accounts, multimedia (photos/videos), text, communications between accounts, and other data associated with one or more accounts.

User asset data structures 74 include an in-game asset data structure 88 storing current and/or or past game asset amount(s) (e.g. game currency amounts) for each account, an external (out-of-game) asset data structure 90 storing current and/or past external asset amounts for each account, and a bonus award data structure 92 storing current and/or past bonus awards for each account, as described below.

As shown in FIG. 4-B, inter-play and side bet management data structures 100 include a plurality of data structures storing data characterizing a current round of play. A current hand identity data structure 102 stores data representing the current hand of each player participating in the respective round of play. A current card identity data structure 104 stores an identity of a current (latest) card drawn by a player, selected from a standard 52-card deck of cards. An inter-play current bet data structure 106 stores a current game asset (e.g. game currency) amount bet by each player in the current round of play. An inter-play cumulative bet data structure 108 stores a cumulative bet placed by each player in the current round of play, representing an amount to be subtracted from the player's game asset account if the player were to lose the current round of play. The cumulative bet includes both a default bet (ante), and optional, player-selected bets placed after the ante. A fold status data structure 110 may be a Boolean flag storing the fold status (folded/not folded) for each player. An inter-play award data structure 112 stores a game asset amount to be awarded to the winner of the current round of play. A side bet amount data structure 114 stores an amount of a side bet for each player in the current round of play. A side bet award 116 stores an amount of a side bet award won by each player (if any) in the current round of play.

The exemplary data structures illustrated in FIGS. 4-A-B may be better understood by considering the description below, in conjunction with the exemplary client system displays of FIGS. 5-A-E. In some embodiments, systems and methods as described below may be used to implement a variant of five-card-draw poker in which a user is able to exchange a certain number of cards after the first deal. For example, in some embodiments, a user is only able to exchange up to three cards after the first deal. In particular, the system is configured to allow users to exchange cards even after folding in an interplayer game, in order to pursue a side bet win against the house even if the player has lost his/her bet(s) against other (peer) players.

FIGS. 5-A-E show exemplary local client displays illustrating a game-play sequence according to some embodiments of the present invention. The client displays may be generated on client devices 12a-d according to data received from server system 18. The displays may be generated within a browser or other generic rendering application, or within a dedicated application (app) implementing game functionality on a local client such as mobile phone.

FIG. 5-A shows an initial display 120 shown at a beginning of a round of play. A representation of a playing surface (table) 122 includes a representation of a side bet award table 124. Side bet award table 124 lists, in table format, the side bet awards for each of multiple winning hands and multiple side bet amounts. A plurality of player representations (icons) 130, 132, 134 are disposed around the outside of the representation of playing table 122 at regular intervals. In the illustrated embodiment, a current player icon 130 is disposed along the bottom center, a dealer icon 134 is disposed along the top center, and icons 132 representing other human players are disposed at regular intervals along the sides. Each player icon 132 includes a display of a current game asset amount available to the corresponding player in the current round of play (illustrated as 10,000 in game currency in FIG. 5-A). One or more player icons 132 may be graphically highlighted, for example using a thicker line as shown for the player icon in the lower left in FIG. 5-A, to indicate a property of interest of the respective player account. In some embodiments, a player icon is highlighted to indicate that the corresponding account has a sufficiently high standing in a player league table, for example a standing that qualifies the player account to participate in a game at the end of the month or makes the player account eligible for other benefits.

An interactive game currency status table 136 displays a current side bet amount (in game currency), an amount of game currency available to the current player in the current round of play, and a user-interactive icon configured to receive user input to initiate a game currency deposit process.

An interactive bet selection display 138 includes a plurality of user-interactive icons 142, each corresponding to a pre-determined, displayed betting amount. A currently-selected icon (corresponding to a $2 bet in FIG. 5-A) is highlighted relative to the other icons, which represent different game currency amounts ($5, 10, 50, 100 in the illustrated example). Highlighting may be achieved via display in a different size, color, or other distinguishing display feature. Icons 142 are responsive to user input to allow a user to indicate a selection of a current bet to be placed.

A user-interactive round-exit icon 144 is configured to receive user input initiating a termination of the user's participation in the current round of play and exit to a higher menu display (lobby).

In exemplary embodiments, multiple players (user accounts) are assigned to a game, and assigned seating positions around playing table 122. For example, seating positions may be assigned first-come first-served, starting at a top of the table and moving clockwise. In some embodiments, a seated player has automatically agreed to place a minimum side bet; in other words, a side bet is mandatory, rather than an optional feature for each player. In some embodiments, a game requires at least two players (other than the house) to start, and may have up to seven players. The dealer role is assigned to the player at the top of the table, and is circulated by one spot clockwise after each round of play. Betting and card draws also circulate clockwise.

The dealer automatically places a predetermined amount of game currency (the ante) into a pot of game currency to be distributed to the winner of the current round of play. In other words, in response to an indicator that a game start condition is met, an amount representing the ante is automatically subtracted from the value representing the current dealer' game currency assets, and added to the value representing the pot for the current round of play.

FIG. 5-B shows a subsequent display 150 shown to a user after display 120. As shown, a user-interactive bet confirmation icon 152 is configured to receive user input confirming a selection of a current side bet placed using the interface display shown in FIG. 5-A. Also, the current player icon 130 displays the current player's game asset total available for the round of play ($10,000 in game currency in the illustrated example). In some embodiments, the current player's game asset total available for the round of play is displayed to the user at all times during the round of play.

An exemplary player icon 133 graphically illustrates the passage of a predetermined amount of time (e.g. 5, 6, 8, 10, 15, or 20 seconds) available to the corresponding player account to make a playing decision (e.g. bet, draw, fold), before a default action (e.g. fold or call) is taken in the absence of an express decision. A highlighted sector 135 of a circle 137 is defined by a sector angle that linearly increases from zero to 360 degrees over the predetermined amount of time. The highlight may be achieved with a different color overlay shown over the player's game asset total display. In some embodiments, the color of the overlay may change with time, for example may be green for the first half of the predetermined time interval, yellow for the next quarter, and red for the final quarter of the time interval. The graphical highlight proceeds to the next selected player, clockwise, upon receiving user input selecting a player decision or upon expiration of the predetermined time interval, whichever is earlier. A player icon 133 may be displayed on screens other than the one shown in FIG. 5-B, at various points in a game as described below.

FIG. 5-C shows a display 160 that may be shown to a user during game play. Display 160 includes a set of user-interactive game action selection icons 162 configured to receive user input selecting one of a plurality of game actions, including fold, call, call any, and raise. An exemplary icon (representing "Call any" in FIG. 5-C) is highlighted in response to user input selecting the icon. An interplayer bet amount indicator 164 is displayed next to a representation of the player who has played the respective interplayer bet. Playing card displays 166, 168 are also shown next to representations of corresponding players. Playing card displays 166 for other players show the cards in a covered position, while a playing card display 168 for the current player shows the identity of the playing cards of the current player. The exemplary display 160 illustrates a game play display after all players have placed an ante (fixed bet), shown as $25 in game currency.

FIG. 5-D shows another display 170 that may be shown to a user after display 160, illustrating a bet placed by a counterpart player and a corresponding choice of actions for the current player. Display 170 includes a set of user-interactive game action selection icons 172 configured to receive user input selecting one of a plurality of game actions, including fold, call, call any, and raise. Once user input selecting "call any" is entered by a player, that player's actions default to "call" until canceled by the player. A counterpart player bet representation 174 displays an amount of a bet placed by another player. In the illustrated example, the first player after the dealer (clockwise) is shown as having bet $25 in game currency.

FIG. 5-E shows a display 180 that may be shown to a user during game play to elicit user input selecting an interplayer bet amount. A vertical bar 182 spans a betting amount from a minimum (at a bottom of the bar) to a maximum (all in, at a top 188 of the bar). A slider selector display 184 is configured to receive user input selecting a vertical position of the slider, thus selecting a corresponding interplayer bet amount, displayed at 186.

FIG. 5-F shows a display 190 illustrating a plurality of exemplary player hands and associated round-cumulative interplayer bets placed by each corresponding player account at an end of a round of play. The current player hand (a straight, shown at 192*a*) loses the interplayer game award to a higher hand but wins a side bet award. Another player hand (a full house, shown at 192*b*) also loses the interplayer game award but wins a side bet award. An exemplary player hand 192*c* loses the interplayer game award by folding, and does not win a side bet award. An exemplary player hand 192*d* (four of a kind) is the highest hand at the end of the round of play, and wins both the interplayer game award and a side bet award. Another exemplary player hand 192*e* wins neither the interplayer game award nor a side bet award. Exemplary player hands 192*f-g* do not win the interplayer game award but win side bet awards for one pair and two pairs, respectively.

FIG. 5-G shows a display 194 that may be shown to a user at the end of a round of play if the user has won a side bet. A set of user-interactive bet selection icons 196 is configured to receive user input selecting a side bet amount for a subsequent round of play. As shown, the side bet amount used in the current round of play is highlighted. A side bet award notification icon 198 displays an amount of game currency won by the current player in the current round of play as a result of the user's side bet.

FIG. 6-A shows an exemplary flow chart illustrating a set of account setup and management steps 200 according to some embodiments of the present invention. Unless otherwise stated explicitly, all illustrated steps may be performed in the order shown, or in different orders. In a step 202, a local client 12*a-d* receives user input and communicates with server system 18 (FIG. 1) to set up an account for the user on a gaming platform operated by server system 18. The user input may include account information to be used in subsequent steps described below. Such information may include name, user ID, contact information such as email address, age, and other personal or other account information such as financial information.

In a step 204, the eligibility of the user to create an account is verified using the entered user input and/or other information. For example, an age check may be used to confirm that the account holder is of legal age, for example over 18. Eligibility verification may be performed in conjunction with a third party service provider. For example, if a user already has an account with a predetermined existing gaming company or platform, the user may be automatically deemed eligible to open an account. Such a third party may have already performed age and/or other eligibility checks for the user, thus making additional checks potentially redundant.

In a step 206, a set of authentication setup steps are performed. Such steps may include validating a user-entered password, generating corresponding data (e.g. salted/hashed password indicator) used for authentication, and enabling two-factor authentication for the account. In a step 208, an external financial account and/or other source of funds (e.g. bank account, debit or credit card) is/are linked to the user account, in order to allow financial transfers to/from the user's account. Step 208 may also include performing a financial transfer of a minimum external currency (e.g. USD) amount needed to open an account.

In a step 212, a pre-determined or user selected amount of external currency is converted to in-game currency at a predetermined exchange rate. The exchange rate may be 1:1, or some rate different from 1:1 (e.g. 1:10 or 1:100). In a step 216, a league table data structure maintaining a league table having multiple accounts is updated to reflect the creation of the new account. The league table update may include assigning a rank to the new account in an ordered list according to one or more league table ranking criteria. In a step 218, the newly-created account is activated, and game play is enabled for the user.

FIG. 6-B shows an exemplary flow chart illustrating a number of steps 300 performed during a round of play according to some embodiments of the present invention. In a step 302, a set of initial playing cards are determined for all the player accounts participating in the round of play, and corresponding displays are generated for each player account as shown above. In a step 304, the next betting/card draw round commences. In a step 306, one or more current players are selected for the action(s) to be performed in the game. At least in some phases of the round of play, a single player is the current player. In a step 308, user input is received from the current player, and responsive actions are performed in response to the user input. In a step 310, a verification is performed to check whether all participating players have played during the current betting/draw round. If no, the process loops back to step 306, and if yes, the process proceeds to a step 312. In step 312, a verification is performed to check whether the process has reached an end of the round of play. If no, the process loops back to step 304, and if yes, the process proceeds to a step 316. In step 316, a session defined by the round of play ends, and each player participating in that round of play is assigned to a next round of play (against the same players) or presented with a higher menu display in response to user input selecting the corresponding choice.

FIG. 6-C shows another exemplary flow chart illustrating a number of steps 400 performed during a round of play according to some embodiments of the present invention. In a step 402, a user interface on a client device 12*a-d* receives user input indicating a fold action for a user's hand during a selected card draw round in the round of play. Such user input may include, for example, a user's interaction with a "Fold" graphical icon as shown in FIG. 5-C. In a step 404, an interplayer game fold status data structure is updated in response to receiving the user input from the client device. The interplayer game fold status data structure maintains a fold status for the user's hand for the round of play. The data structure may be formed by or include a Boolean (binary I/O) flag for each player participating in the round of play. Updating the fold status data structure may include writing an appropriate Boolean value (I/O) to the corresponding field.

In a step 406, a card draw is performed for the current player. Step 406 for the current player even if the interplayer game fold status data structure for the current player indicates that the current player selected a fold action during a previous betting/draw round in the current round of play. The card draw may include identifying a number of cards to be drawn according to received user input, and drawing that number of cards. The card draw may also include identifying a number of cards to be discarded by the current player in response to user input, and discarding the identified cards. Drawing a card may include selecting a random/pseudorandom number representing a card from among available cards that may be drawn in the round. In response to the card draw, a card identity data structure for the current player is updated to include the drawn card(s), and an available card data structure for the round of play is updated to remove the drawn card(s) from the list of cards available to be drawn.

In a step 408, a hand identity data structure for the current player is updated to reflect the cards drawn and/or discarded in step 406. If the data structure is an array, the values held by the corresponding array indexes are updated to replace the values representing by discarded cards with values representing corresponding drawn cards.

In a step 410, a side bet data structure for the current player is updated in response to received user input. Step 410 may be performed before or after one or more of steps 402-408. For example, in some embodiments step 410 is performed before step 402 in the sequence of FIG. 6-C. The side bet data structure stores the amount of a side bet selected by the user for the current round of play in response to a display such as the one shown in FIG. 5-B. The side bet data structure for the current player may include or be formed by an integer, and may be part of an array of integers representing all players participating in the round of play.

In a step 412, an interplayer bet data structure for the current player is updated in response to received user input. As above, step 412 may be performed before or after one or more of steps 402-410. The interplayer bet data structure for the current player stores an amount (in game currency) of a bet placed by the current player in the current betting/draw round. The interplayer bet data structure for the current player may also store a cumulative bet placed by the current player in the current round of play, across one or more betting/draw rounds. The interplayer bet data structure for each player may include or be formed by an array of two integers. Each such pair of integers may be part of a larger array indexed by player in the current round of play.

In a step 416, a side bet award data structure for the current player is updated in response to detection of an end of the current round of play. A side bet award value is determined according to an amount stored in the side bet data structure for the current player in the current round of play, according to a final hand of the current player at the round of play as represented by the current player's hand identity data structure, and according to a table of multiples for each type of hand, represented graphically at 124 in FIG. 5-A. The side bet is multiplied by the corresponding multiple retrieved from the table to generate the side bet award for the current player in the current round of play.

In a step 418, an interplayer game award data structure for the current player is updated in response to detection of the end of the current round of play. An interplayer game award value may be determined for the current player if the current player has been identified as the winner of the current round of play, or in all cases. If the current player is the winner of the current round of play, the interplayer game award value is determined by summing the cumulative interplayer bets placed by all players during the current round of play. If the current player is not the winner of the current round of play, the interplayer game award value may be a negative number equal to the cumulative interplayer bets placed by the current player during the current round of play.

In a step 422, a cumulative award data structure for the current player is updated in response to step 418, by adding the interplayer game award value determined in step 418 to an existing cumulative award value to generate an updated cumulative award value. The update cumulative award value represents the value of the game currency held by the current player, represented graphically at 130 in FIG. 5-B.

In some embodiments, a game including a side bet and allowing players to draw cards during a round of play even after folding may be implemented in poker variants other than five card or three card draw. Such variants may include draw poker, in which players are dealt a complete hand and improve it by replacing cards; stud poker, in which each player receives a combination of face-up and face-down cards in multiple betting rounds; and community-card poker (e.g. Texas hold'em or Omaha hold'em), in which each player's incomplete hidden hand is combined with shared face-up hands.

In some embodiments, a player's virtual currency account is credited with a predetermined, fixed game currency bonus in response to the player's creation of a user account or in response to the start or end of the player's first game. The game currency bonus (e.g. $1,000 in game currency) is added to the game currency converted from external assets (e.g. government-issued currency or digital currency).

In some embodiments, the maximum number of players during a round of play is capped at eight. In some embodiments, the maximum number of players allowed at a virtual table during a round of table may be higher or lower, for example ten, six, or four. In some embodiments, a round of play requires a minimum number of players, for example two.

In some embodiments, a league table is maintained according to players' cumulative winnings over a predetermined period (e.g. each month) in interplayer awards, excluding side bet awards. The league table includes an ordered list of player accounts ranked by cumulative interplayer winnings, with ties allowed. In some embodiments, the top players in the league table may become eligible at predetermined time intervals (e.g. every month) for bonus awards and/or participation in exclusive events. For example, the top players may be invited to a free tournament against other top players, to win set cash and/or digital currency prizes.

In some embodiments, a side bet is mandatory for all players participating in a round of play. In some embodiments, a side bet may be optional, and activated in response to user input or activated by default but removable via user input.

In some embodiments, the interface generated for each player is configured to allow the player to initiate exchanging game currency to/from external assets at any point in a game and/or pre- or post-game screens. In addition, if the game currency amount in the user's account is not sufficient to cover the mandatory side bet for a round of play, the user may be ineligible to participate in the round of play, and is presented with an invitation to convert external assets into additional game currency. In some embodiments, exchanging external assets to game currency is allowed in any screen, while exchanging game currency to external assets is provided for in a specialized account-management screen.

In some embodiments, the interface generated for each player is configured to display the player's hand and the player's game currency account balance at all points in a game and/or pre- and post-game screens.

In some embodiments, certain aspects described above, such as aspects directed to account eligibility validation and/or currency conversion, may be performed by service providers distinct from the operator of the gaming platform described above.

In some embodiments, a timer may be used constrain the betting and/or card draw actions of the players. The cards selected by a player for exchange may be highlighted graphically, for example via display in a larger size or different color, for ease of use and to speed up play.

In some embodiments, a plurality of rounds of play may be grouped together in a session, tournament, or other grouping having a common set of players. Such a grouping may end for example when one of the players has accumulated all the game currency at stake in the grouping, for example all the game currency held by the other players and placed at risk in the grouping of rounds of play.

It will be clear to one skilled in the art that the above embodiments may be altered in many ways without departing from the scope of the invention. Accordingly, the scope of the invention should be determined by the following claims and their legal equivalents.

What is claimed is:

1. A computer system comprising at least one hardware processor and associated memory storing instructions which, when executed, cause the at least one hardware processor to:
   connect to a plurality of player computer systems over a network, each player computer system configured to receive user input from a corresponding poker player of a plurality of poker players;
   generate a multi-player poker game display comprising a representation of a playing surface, and representations of playing cards in a poker game played by the plurality of players against each other, wherein a round of play of the poker game includes a card draw round;
   receive from a player computer system an indicator of user input selecting a fold action for a user's hand in the round of play;
   in response to receiving the indicator of the user input selecting the fold action, update an interplayer game fold status data structure maintaining a fold status for the user's hand for the round of play;
   receive from the player computer system an indicator of user input selecting a card draw action for the user's hand in the round of play, wherein the card draw action is subsequent to the fold action in the round of play, wherein the card draw action comprises receiving an indicator of a number of cards to be drawn and discarded uniquely to/from the user's hand for that round of play, drawing the number of cards to the user's hand, and discarding the number of cards from the user's hand;

update a hand identity data structure for the user according to the card draw action, the hand identity data structure comprising a plurality of card identification fields identifying a current playing hand of the user; and update a side bet award data structure for the user according to a playing hand of the user identified by the hand identity data structure at an end of the round of play.

2. The computer system of claim 1, wherein the instructions further cause the at least one hardware processor to determine a winner of an interplayer game award at the end of the round of play, the interplayer game award determined by identifying the highest hand among players who did not fold during the round of play.

3. The computer system of claim 2, wherein the instructions further cause the at least one hardware processor to receive a plurality of bets made by players during the round of play, and to determine the interplayer game award according to the plurality of bets.

4. The computer system of claim 1, wherein the instructions further cause the at least one hardware processor to maintain a league table over a plurality of rounds of play, the league table comprising an ordered list of players and an associated cumulative game award for each player.

5. The computer system of claim 1, wherein the instructions further cause the at least one hardware processor to maintain a data structure storing a cumulative game award amount for each player over multiple rounds of play of the poker game, the total game award amount reflecting a cumulative side bet award and a cumulative interplayer game award.

6. A non-transitory computer-readable medium encoding instructions which, when executed by a computer system comprising at least one hardware processor and an associated memory, cause the computer system to:

connect to a plurality of player computer systems over a network, each player computer system configured to receive user input from a corresponding poker player of a plurality of poker players;

generate a multi-player poker game display comprising a representation of a playing surface, and representations of playing cards in a poker game played by the plurality of players against each other, wherein a round of play of the poker game includes a card draw round;

receive from a player computer system an indicator of user input selecting a fold action for a user's hand in the round of play;

in response to receiving the indicator of the user input selecting the fold action, update an interplayer game fold status data structure maintaining a fold status for the user's hand for the round of play;

receive from the player computer system an indicator of user input selecting a card draw action for the user's hand in the round of play, wherein the card draw action is subsequent to the fold action in the round of play, wherein the card draw action comprises receiving an indicator of a number of cards to be drawn and discarded uniquely to/from the user's hand for that round of play, drawing the number of cards to the user's hand, and discarding the number of cards from the user's hand;

update a hand identity data structure for the user according to the card draw action, the hand identity data structure comprising a plurality of card identification fields identifying a current playing hand of the user; and update a side bet award data structure for the user according to a playing hand of the user identified by the hand identity data structure at an end of the round of play.

7. The non-transitory computer-readable medium of claim 6, wherein the instructions further causes the computer system to determine a winner of an interplayer game award at the end of the round of play, the interplayer game award determined by identifying the highest hand among players who did not fold during the round of play.

8. The non-transitory computer-readable medium of claim 7, wherein the instructions further causes the computer system to receive a plurality of bets made by players during the round of play, and to determine the interplayer game award according to the plurality of bets.

9. The non-transitory computer-readable medium of claim 6, wherein the instructions further causes the computer system to maintain a league table over a plurality of rounds of play, the league table comprising an ordered list of players and an associated cumulative game award for each player.

10. The non-transitory computer-readable medium of claim 6, wherein the instructions further causes the computer system to maintain a data structure storing a cumulative game award amount for each player over multiple rounds of play of the poker game, the total game award amount reflecting a cumulative side bet award and a cumulative interplayer game award.

11. A method comprising employing at least one hardware processor and associated memory to:

connect to a plurality of player computer systems over a network, each player computer system configured to receive user input from a corresponding poker player of a plurality of poker players;

generate a multi-player poker game display comprising a representation of a playing surface, and representations of playing cards in a poker game played by the plurality of players against each other, wherein a round of play of the poker game includes a card draw round;

receive from a player computer system an indicator of user input selecting a fold action for a user's hand in the round of play;

in response to receiving the indicator of the user input selecting the fold action, update an interplayer game fold status data structure maintaining a fold status for the user's hand for the round of play;

receive from the player computer system an indicator of user input selecting a card draw action for the user's hand in the round of play, wherein the card draw action is subsequent to the fold action in the round of play, wherein the card draw action comprises receiving an indicator of a number of cards to be drawn and discarded uniquely to/from the user's hand for that round of play, drawing the number of cards to the user's hand, and discarding the number of cards from the user's hand;

update a hand identity data structure for the user according to the card draw action, the hand identity data structure comprising a plurality of card identification fields identifying a current playing hand of the user; and update a side bet award data structure for the user according to a playing hand of the user identified by the hand identity data structure at an end of the round of play.

12. The method of claim 11, further comprising employing the at least one hardware processor and associated memory to determine a winner of an interplayer game award at the end of the round of play, the interplayer game award determined by identifying the highest hand among players who did not fold during the round of play.

13. The method of claim 12, further comprising employing the at least one hardware processor and associated memory to receive a plurality of bets made by players during the round of play, and to determine the interplayer game award according to the plurality of bets.

14. The method of claim 11, further comprising employing the at least one hardware processor and associated memory to maintain a league table over a plurality of rounds of play, the league table comprising an ordered list of players and an associated cumulative game award for each player.

15. The method of claim 11, further comprising employing the at least one hardware processor and associated memory to maintain a data structure storing a cumulative game award amount for each player over multiple rounds of play of the poker game, the total game award amount reflecting a cumulative side bet award and a cumulative interplayer game award.

* * * * *